United States Patent [19]
Rasmussen et al.

[11] Patent Number: 5,460,733
[45] Date of Patent: Oct. 24, 1995

[54] CONTROL SYSTEM DISTINGUISHING FILTERABILITY OF MEDIUM FILTERED

[75] Inventors: Sigmund Rasmussen, Tranby; Lars Horlyk, Sandvika, both of Norway; Rolf Oswaldsson, Gävle; Kent Strid, Järbo, both of Sweden

[73] Assignee: Caustec AB, Goteborg, Sweden

[21] Appl. No.: 162,160

[22] PCT Filed: Jun. 5, 1992

[86] PCT No.: PCT/NO92/00099

§ 371 Date: Feb. 14, 1994

§ 102(e) Date: Feb. 14, 1994

[87] PCT Pub. No.: WO92/22374

PCT Pub. Date: Dec. 23, 1992

[30] Foreign Application Priority Data

Jun. 14, 1991 [NO] Norway ................................ 912312

[51] Int. Cl.$^6$ .................................................. B01D 35/12
[52] U.S. Cl. .............................. 210/741; 73/61.63; 95/20; 210/333.01; 210/791

[58] Field of Search ............................ 210/90, 108, 332, 210/333.01, 333.1, 741, 791, 798, 106, 739, 96.1, 138; 95/20; 73/61, 63

[56] References Cited

U.S. PATENT DOCUMENTS

| | | | |
|---|---|---|---|
| 2,572,436 | 10/1951 | Boucher et al. | 73/61.63 |
| 3,455,146 | 7/1969 | Smith et al. | 73/61.63 |
| 4,264,445 | 4/1981 | Lumikko et al. | 210/333.01 |
| 4,482,461 | 11/1984 | Hindman et al. | 210/744 |
| 5,053,141 | 10/1991 | Laiho | 210/106 |
| 5,149,449 | 9/1992 | Strid et al. | 210/332 |

*Primary Examiner*—Joseph W. Drodge
*Attorney, Agent, or Firm*—Young & Thompson

[57] ABSTRACT

A method for controlling a filtration assembly wherein the amount of medium introduced into the filtration assembly is constant, even though the filterability of the medium or the condition of the filters has changed. The working cycle of the filtration assembly changes when the pressure difference across the filter mesh increases over a certain period of time. The control system is capable of distinguishing between the filterability of the medium introduced and the condition of the filter mesh.

6 Claims, 2 Drawing Sheets

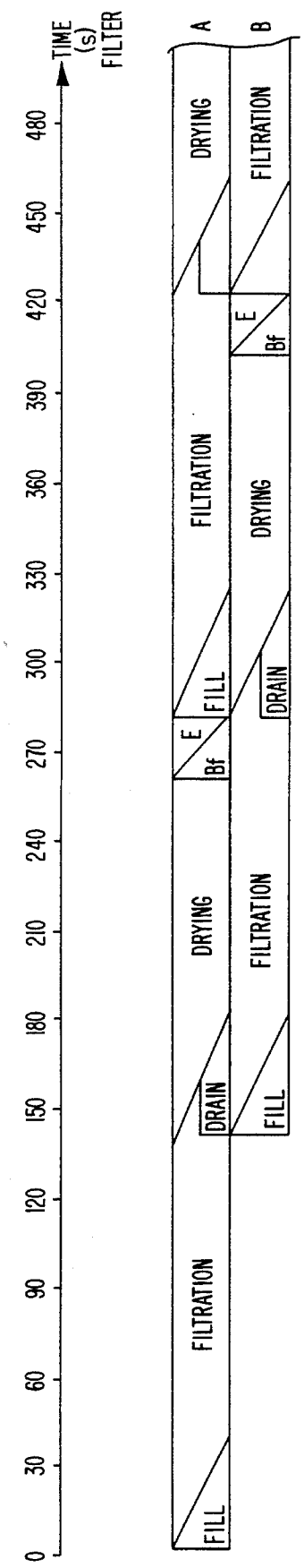
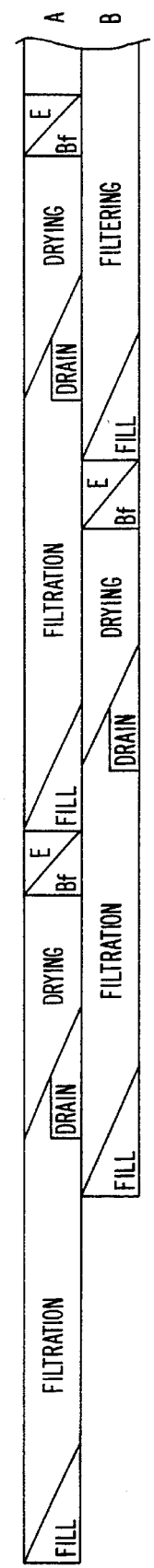
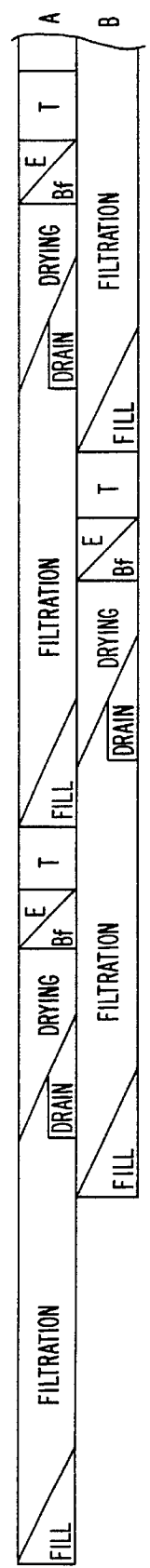
FIG.2a
FIG.2b
FIG.2c 5,460,733

CONTROL SYSTEM DISTINGUISHING FILTERABILITY OF MEDIUM FILTERED

FIELD OF THE INVENTION

The present invention relates to a control system for a filtration assembly, and particularly a control system for the filtration assembly described in Swedish patent application no. 8903267 corresponding to PCT/SE90/00639.

BACKGROUND OF THE INVENTION

With filtration according to the aforementioned applications, one uses a stationary filter disposed in a pressure vessel, wherein after completion of the filtration, a reset operation is carried out, comprising back-flushing of the filter before the start of the next filtration. The filtration takes place through at least one substantially vertically disposed filter element covered with a filter mesh surrounding at least one filter duct, through which flows the filtrate obtained during the filtration, e.g., white liquor or green liquor, while the filtered material, for example lime sludge (calcium carbonate) is deposited on the filter mesh. The pressure vessel is provided with at least one inlet for the suspension that is to be filtered, an outlet for the filtrate obtained, an outlet for the obtained material and an inlet for the medium for resetting the filter.

According to the prior art, in the utilization of a stationary filter during the lye treatment, the separation of white liquor and lime sludge is carried out in a so-called tube filter, i.e., downwardly suspended perforated tubes covered with filter mesh, where the filter outlet is directed upward. This tube filter is divided into discrete units having separate white liquor outlets from each section. While sections of the tube filter are being back-flushed, which is done with liquid that has already been filtered, i.e., white liquor, the filtration takes place in the other sections. This results in, inter alia, a low rate of utilization of the filter. In addition, during the entire process there is a continuous production of deposited material, i.e., lime sludge, from the back-flushing. This entails the disadvantage, among others, of the lime sludge having a high content of unfiltered liquid with a high content of chemicals.

Swedish patent application no. 7909774 describes a pressure filter and a method of filtration wherein the filtration time is altered as a result of the filterability of the suspension that is introduced. This means that one will have no indications of the condition of the filter.

SUMMARY OF THE INVENTION

By utilizing the present invention, it is possible for the amount of suspension being introduced to the filtration assembly to be kept constant and continuous, regardless of the suspension's filterability. In addition, the system will provide feedback on the condition of the filter and on the eventual need to replace one or more filter meshes.

This is achieved according to the invention with a control system that is characterized in that the working cycle of the filtration assembly is altered when the pressure difference across the filter mesh increases over a certain period of time, where the control system is capable of differentiating between the filterability of the medium introduced and the condition of the filter mesh. The filtration assembly comprises two or more filters, and the working cycle for all the filters is readjusted simultaneously. In the event of a change in the filterability of the medium introduced and/or the condition of the filter mesh, it is the reset time that is altered. If the reset time is reduced to a predetermined value, a fluid is passed through the filter mesh to determine the drop in pressure across the filter mesh.

BRIEF DESCRIPTION OF THE DRAWINGS

Additional details and features of the invention will be apparent from the further description of a preferred embodiment form, with reference to the accompanying drawings.

FIG. 2 shows the operational sequence of the control system in three different cases where the filterability of the suspension and/or the condition of the filter is changed.

DETAILED DESCRIPTION OF THE INVENTION

Figure 1:
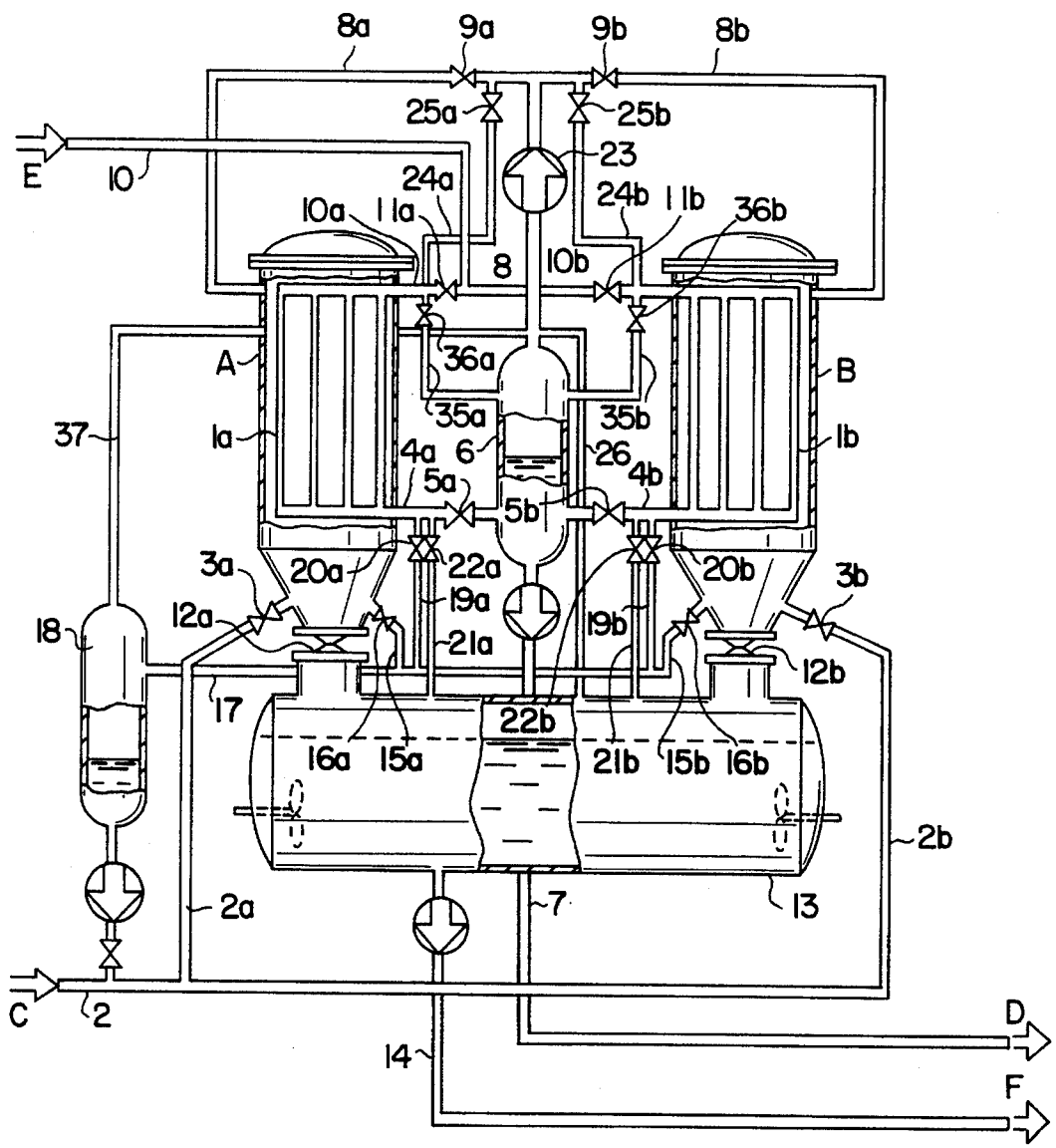
FIG. 1 shows a filtration system having two pressure vessels to which the control system is specially adapted.

In FIG. 1 is shown a filtration assembly in accordance with SE 8909267, where the suspension to be filtered is introduced at arrow C through line 2, which divides into two lines 2a and 2b leading to filter devices A and B, respectively. In the illustrated embodiment form of the filtration assembly in FIG. 1, the suspension that is introduced is white liquor lime sludge. On lines 2a and 2b are mounted valves 3a and 3b. Filtrate lines 4a and 4b with respective valves 5a and 5b run from the base of filters 1a and 1b, and the filtrate lines lead to the filtrate separator 6 for separation of filtrate, white liquor and the gas (air or air/vapor mixture) that follows with the white liquor to separator 6. The white liquor is emitted from separator 6 through outlet line 7 from the filtration assembly (arrow D), and the air is conducted from separator 6 via line 8 via a compressor 23 either through branch line 8a with valve 9a back to vessel A or through branch line 8b with valve 9b back to vessel B, to be used during the reset stage. For the reset stage there is provided a feed line 10 (arrow E) for the back-flushing medium, e.g., water, either to vessel A through branch line 10 with valve 11a or to vessel B through branch line 10b with valve 11b. The lime sludge that is removed during the reset stage is removed from the bottom of vessel A via valve 12a and from the bottom of vessel B via valve 12b, and this lime sludge is sent to a common tank provided for both vessels, e.g., a so-called lime sludge agitator. Preferably, prior to its removal from the pressure vessel, the lime sludge is drained with back-flushing fluid, and lime sludge diluted with back-flushing fluid is discharged from the filtration assembly through line 14 (arrow F). The illustrated filtration assembly also comprises drain lines 15a and 15b with valves 16a and 16b from each vessel, leading to a return line 17, which via pump tank 18 feeds into the white liquor's feed line 2. In addition, between filtrate line 4a, from a point prior to valve 5a, and return line 17, is extended a line 19a with valve 20a, and in the same manner there is provided a line 19b with valve 20b between filtrate line 4b and return line 17. Also, between filtrate line 4a from a point prior to valve 5a and tank 13 there is provided a line 21a with valve 22a, and likewise a line 21b with valve 22b. Further, a line 25 is provided between gas line 8 from separator 6 and tank 13. Between the air branch line 8a and the water branch line 10a at a point before valve 9a and after valve 11a, there is provided a line 24a with valve 25a; and in similar fashion there is provided line 24b with valve 25b between the air branch line 8b and water branch line 10b.

The purpose of the various lines and valves will now be described in more detail in connection with the functional description of a filtration cycle in pressure vessel A and a reset cycle in vessel B. The process is also illustrated schematically in FIG. 2a.

Before the filtration cycle begins, the previously deposited lime sludge is removed from vessel A, and the vessel is essentially drained of any white liquor lime sludge remaining from previous filtering processes. When the filtration begins, valve 3b is closed and the white liquor lime sludge is introduced into vessel A through line 2a and the open valve 3a. This filling of the filter is shown farthest to the left in FIG. 2a and designated as "Fill". During this brief introductory period, the filtrate valve 5a is kept closed while valve 20a is open. The purpose of this is to send the first filtered white liquor back to the incoming white liquor lime sludge, and this is done through lines 19a and 17. Valve 20a is then closed, and filtrate valves 5a and 36a are opened, just prior to the closing of valve 20a, and are kept open during the entire course of filtration, designated as "Filtration" in FIG. 2a. All other valves in connection with vessel A are kept closed, i.e., valves 9a, 11a, 12a, 16a, 22a and 25a. During the actual filtration cycle, it is thus only valve 3a for the introduction of white liquor lime sludge, and valves 5a and 36a for the removal of the white liquor that are open. The filtration preferably takes place with the entire filter 1a disposed in the white liquor lime sludge, whereby the entire filter is used for the filtration, and the filtration proceeds until a suitable pressure difference is obtained across the filter element. Preferably, this pressure difference is determined at least primarily by the pressure of the incoming white liquor lime sludge. It may, however, be determined at least to a certain degree by a vacuum within the filter, or a difference in the level between separator 6 and the filter. The white liquor is discharged, as described earlier, through line 7 from separator 6. In pressure vessel A the filtration is concluded after attainment of the aforementioned suitable pressure difference, and vessel A will now be reset for a new filtration cycle. At the start of the reset cycle, valve 3a is closed. This is indicated in FIG. 2a as "Drain." Valve 9a is opened and air/vapor mixture is fed from separator 6 via line 8 with compressor 23 and line 8b to the inside of the vessel to dry the deposited lime sludge on the filter mesh, whereupon it is further relieved of white liquor and thus also chemicals. Immediately after valve 9a is opened, valve 16a is opened to remove unfiltered white liquor lime sludge which is fed back via line 17 to the incoming white liquor lime sludge. This is indicated in FIG. 2a as "Drying". After completion of the drying of the lime sludge layer, drain valve 16a is closed, followed immediately by closing of filtrate valve 5a and air valve 9a. Valve 11a is now opened for back-flushing of the lime-sludge layer, indicated as "Bf" in FIG. 2a, with back-flushing fluid, e.g., water from line 10, 10a in connection with the filter's filtrate ducts. Preferably the back-flushing fluid is introduced such that the diluted lime sludge is caused to run down on its own into tank 19 through valve 12a, which is opened immediately after valve 11a has been opened. Valve 22a is then opened for a brief period for draining of the dilution fluid in the filter through line 21a down to tank 13. This is indicated as "E" (empty) in FIG. 2a.

An operational cycle corresponding to that described above for vessel A is also carried out in vessel B. In FIG. 2a, the upper sector shows the operational sequence for vessel A, while the lower part of the figure shows the operational sequence for vessel B. The time indications at the top of FIG. 2 are included for purposes of illustration only, and should not be considered limiting factors for the invention.

FIG. 2a thus shows a normal operational sequence (basic adjustment) for the two filters A and B. In FIG. 2b is shown a corresponding operational sequence wherein the drying time is reduced substantially in relation to FIG. 2a. This reduction of the drying time may result from two causes: either that the filterability of the suspension being introduced has changed substantially, or that the condition of the filter mesh has changed. This change in the drying time is carried out by the control system itself if the pressure difference across the filter builds up too rapidly. By reducing the drying time and maintaining the filtration time, the capacity of the filtration assembly is not altered. In FIG. 2c is shown a situation where the drying time has been reduced to a minimum value. When this minimum value occurs, the control system will make a check on the condition of the filter mesh after the drying (indicated as "T" (test) in FIG. 2c). This testing of the filter mesh is done by passing a fluid (e.g., water or air) into the filter and measuring the pressure difference across the filter mesh. If the pressure difference is higher than a certain predetermined value, the control system will be able to indicate whether it is time to replace the filter mesh.

Although the utilization of the control system is described with reference to a specific filtration assembly, it is self-evident that the invention may also be used with other types of filtration devices. It should also be noted that the control system may be used to control more than two filters simultaneously.

We claim:

1. In a method for controlling a filtration assembly comprised of at least two filters, each filter having at least one filter element covered by a filter mesh with filtration taking place through said at least one filter element, and wherein the working cycle of the filtration assembly is altered when the pressure difference across at least one filter mesh exceeds a value, the improvement which comprises:

maintaining the flow rate of a medium introduced to the filtration assembly substantially constant, even after the filterability of said medium or the condition of the filters changes, said filtration assembly further comprising a control system capable of differentiating between the filterability of the medium introduced and the condition of the filter mesh of said at least one filter element, the differentiating being determined by said control system causing a different medium to pass through said assembly for testing the condition of each said filter mesh after an occurrence of said exceeding.

2. A method according to claim 1, further comprising simultaneously adjusting the working cycle for all the filters in response to an occurrence of at least one of said changes.

3. A method according to claim 1, further comprising carrying out a reset operation after said filtration by back-flushing said at least one filter element, and altering the time of the reset operation as a result of at least one of a change in the filterability of the medium introduced and the condition of the filter mesh of said at least one element.

4. A method according to claim 3, further comprising testing the condition of each said filter mesh by passing a fluid through each said filter mesh to determine the pressure differential thereacross.

5. A method according to claim 4, wherein the fluid passed through each said filter mesh to determine the pressure differential thereacross is water or air.

6. A method according to claim 3, wherein each said filter mesh is backflushed with water.

* * * * *